United States Patent [19]
Amini et al.

[11] Patent Number: 5,448,703
[45] Date of Patent: Sep. 5, 1995

[54] METHOD AND APPARATUS FOR PROVIDING BACK-TO-BACK DATA TRANSFERS IN AN INFORMATION HANDLING SYSTEM HAVING A MULTIPLEXED BUS

[75] Inventors: Nader Amini, Boca Raton; Ashu Kohli, Delray Beach, both of Fla.

[73] Assignee: International Business Machines Corporation, Armonk, N.Y.

[21] Appl. No.: 68,882

[22] Filed: May 28, 1993

[51] Int. Cl.⁶ .......................... G06F 13/00; G11C 5/00
[52] U.S. Cl. ..................................... 395/290; 395/410; 395/494; 395/821; 365/189.07
[58] Field of Search ................................ 395/325, 425; 365/189.07

[56] References Cited
U.S. PATENT DOCUMENTS 4,112,490  9/1978  Pohlman et al. ...................... 395/325
4,463,421  7/1984  Laws ..................................... 395/325
4,878,166  10/1989  Johnson et al. ...................... 395/425
5,191,656  3/1993  Forde, III et al. ................... 395/325

Primary Examiner—Jack B. Harvey
Assistant Examiner—Jeffrey K. Seto
Attorney, Agent, or Firm—Robert S. Babayi; John A. Kastelic

[57] ABSTRACT

A device for generating back-to-back data transfers on a bus in an information handling system. A detector for determining whether a first address value and a second address are within a range, a first register connected to the detector for storing the first address until the device generates the second address, a second register connected to the detector for storing the range value, and a transfer state block for driving the second address on the peripheral bus without a turnaround cycle if the detector determines that the first and second addresses are within the range. Thus, back-to-back data transfers are provided.

23 Claims, 8 Drawing Sheets

METHOD AND APPARATUS FOR PROVIDING BACK-TO-BACK DATA TRANSFERS IN AN INFORMATION HANDLING SYSTEM HAVING A MULTIPLEXED BUS

RELATED APPLICATIONS

The following United States patent applications are incorporated herein by reference as if they had been fully set out:

Application Ser. No. 08/068,477 Filed May 28, 1993 Entitled "DIRECT MEMORY ACCESS (DMA) CYCLE LOGIC FOR MULTIPLE BUS COMPUTER SYSTEM" (Further identified as Attorney Docket BC9-93-010);

Application Ser. No. 08/069,253 Filed May 28, 1993 now U.S. Pat. No. 5,396,602 Entitled "ARBITRATION LOGIC FOR MULTIPLE BUS COMPUTER SYSTEM RELATED APPLICATIONS" (Further identified as Attorney Docket BC9-93-011);

Application Ser. No. 08/070,134 Filed May 28, 1993 Entitled "METHOD AND APPARATUS FOR INITIALIZING MULTIPLE BUS NETWORKS IN AN INFORMATION HANDLING SYSTEM" (Further identified as Attorney Docket BC9-93-012);

Application Ser. No. 08/069,230 Filed May 28, 1993 Entitled "ERROR CAPTURE LOGIC FOR PERIPHERAL BUS IN MULTIPLE BUS COMPUTER SYSTEM" (Further identified as Attorney Docket BC9-93-025);

Application Ser. No. 08/069,234 Filed May 28, 1993 Entitled "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM" (Further identified as Attorney Docket BC9-93-030); and Application Ser. No. 08/068,877 Filed May 28, 1993 Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS" (Further identified as Attorney Docket BC9-93-031).

FIELD OF THE INVENTION

The present invention relates generally to information handling systems and more specifically to a method and apparatus for providing back-to-back data transfers on a bus that has data multiplexed on it in an information handling system.

BACKGROUND OF THE INVENTION

Referring generally to information handling systems, they normally have as their main component a central processing unit (CPU), which directs all communications in the system and orchestrates all commands to be executed by the information handling system. Information handling systems also usually have a network, or networks, of physical connection devices called buses. These networks connect the CPU to any number of peripheral devices so that the CPU can communicate with the peripheral devices.

One type of bus that may be used in information handling systems is a multiplexed bus. Multiplexed buses have different signals, each containing different information, operating on the same communication line. For instance, a multiplexed bus may have information indicating a particular register address, and data information to be read from or written to that register address, multiplexed on the same communication line. In contrast, a non-multiplexed or parallel bus would have two separate communication lines, one for the address information and one for data.

A multiplexed bus has an advantage over a parallel bus in that a multiplexed bus requires far less space in the information handling system than a parallel bus. Since each of its communication lines can carry more than one signal, a multiplexed bus requires approximately one half the amount of communication lines required by a parallel bus. Furthermore, the peripheral devices that are compatible with a multiplexed bus only require approximately one half the connection points to the bus, or pins, that are required by peripheral devices that are compatible with parallel buses. Thus, the overall size of a multiplexed bus is smaller than a parallel bus, and peripheral devices used with a multiplex bus are smaller than the devices used with a parallel bus as well. Accordingly, these smaller hardware devices require less space in the overall information handling system than a system using parallel buses. Because space is always at a premium in such systems, the multiplexed bus provides an advantage over the parallel bus.

The use of multiplexed buses in an information handling system, however, creates another problem contention for the use of the bus by the components of the system. The components of an information handling system are the CPU, the peripheral devices and any other hardware device that can transmit information on or receive information from the buses in the system. Only one component in the system can transmit information on any one communication line of a particular bus at any one time. In fact, if one component attempts to transmit information on a communication line while it is being used by another component, electrical damage to the information handling system will occur. Accordingly, because there are fewer lines on a multiplexed bus, and each of these lines is carrying more than one signal, the components of the information handling system are constantly contending with one and other to gain control of the communication lines of the bus. This contention creates a que of components waiting to use various communication lines, which, in turn, decreases the speed at which data is transferred in the information handling system.

Furthermore, when one component stops transmitting information on a communication line, before that communication line can be used by another component, the communication line must go through a down period called a turnaround cycle. During a turnaround cycle, the communication line pauses and refuses to accept any new information from any component. The bus is essentially non-operational during a turnaround cycle. Turnaround cycles are required on multiplexed buses to ensure that two devices do not transmit information on the bus at once causing electrical damage as described above. Turnaround cycles further decrease the speed of multiplexed buses.

Decreased speed is a disadvantage of multiplexed buses. Accordingly, it is desirable to implement various techniques to increase the speed of data transfers on multiplexed buses.

One technique that can be used to increase the speed of multiplexed buses is to eliminate the turnaround cycles for certain data transfers so that the data transfers can be performed "back-to-back". Accordingly, a method and apparatus is needed that eliminates certain turnaround cycles, and thus, provides back-to-back data transfers.

SUMMARY OF THE INVENTION

Thus, the present invention provides a device for generating back-to-back data transfers on a bus in an information handling system. The inventive device includes a detector for determining whether a first address value and a second address are within a range, a first register connected to the detector for storing the first address until the device generates the second address, a second register connected to the detector for storing the range value, and a transfer state logic for driving the second address on the peripheral bus without a turnaround cycle if the detector determines that the first and second addresses are within the range. Thus, back-to-back data transfers are executed.

DETAILED DESCRIPTION OF THE PREFERRED EMBODIMENT

Figure 1A:
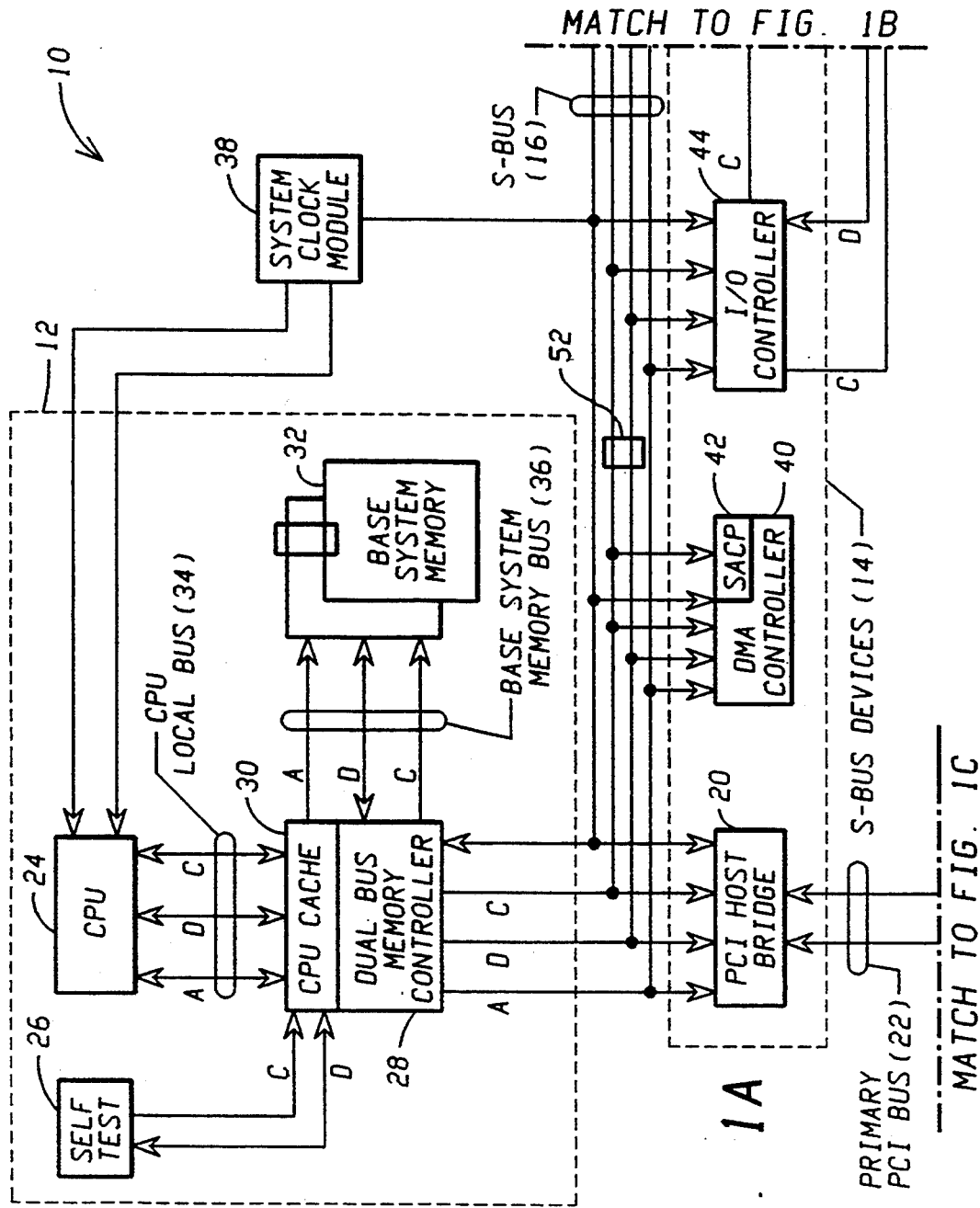
FIGS. 1A through 1C, taken together, is a schematic drawing of an information handling system with multiple buses.
Figure 1B:
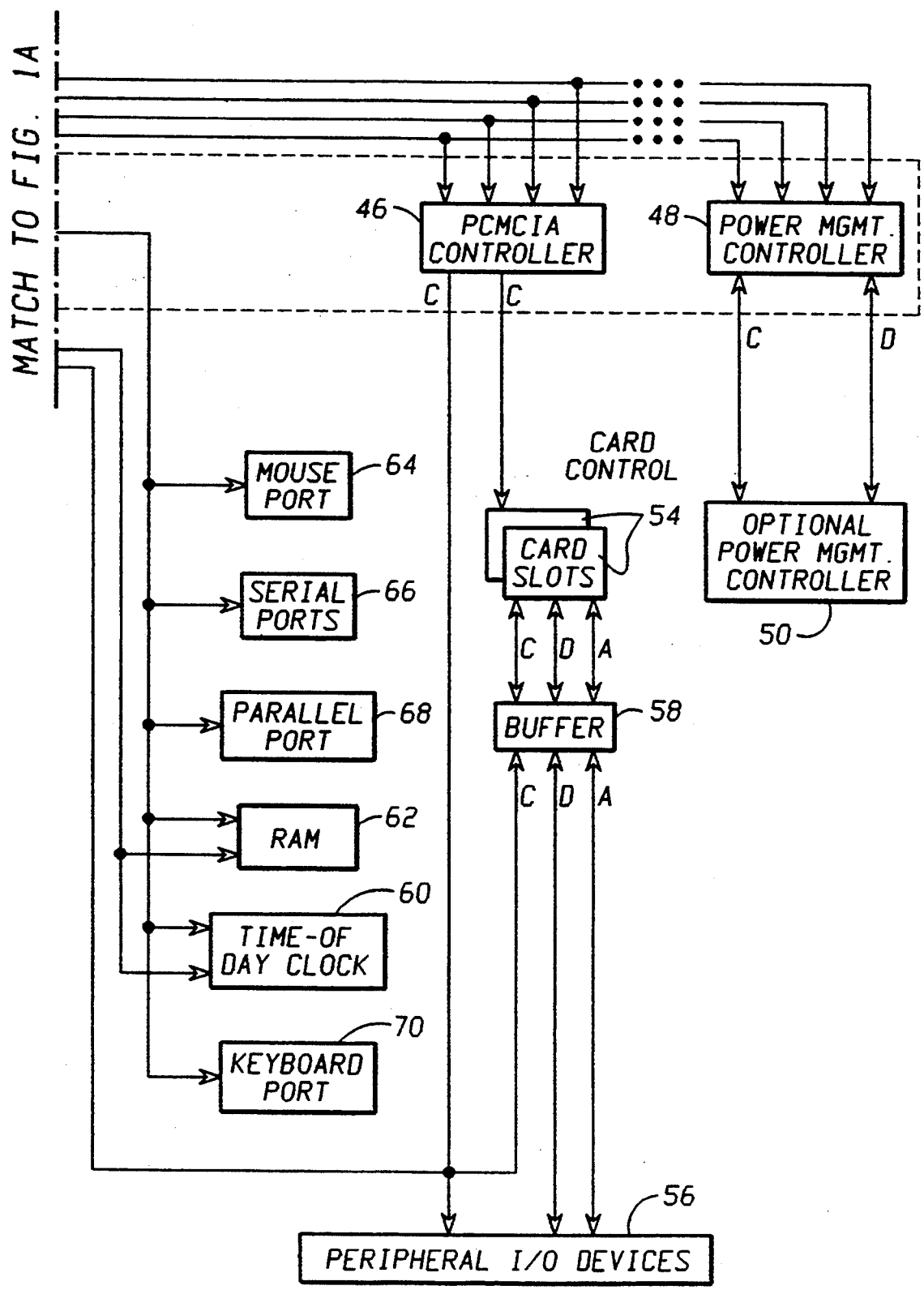
Figure 1C:
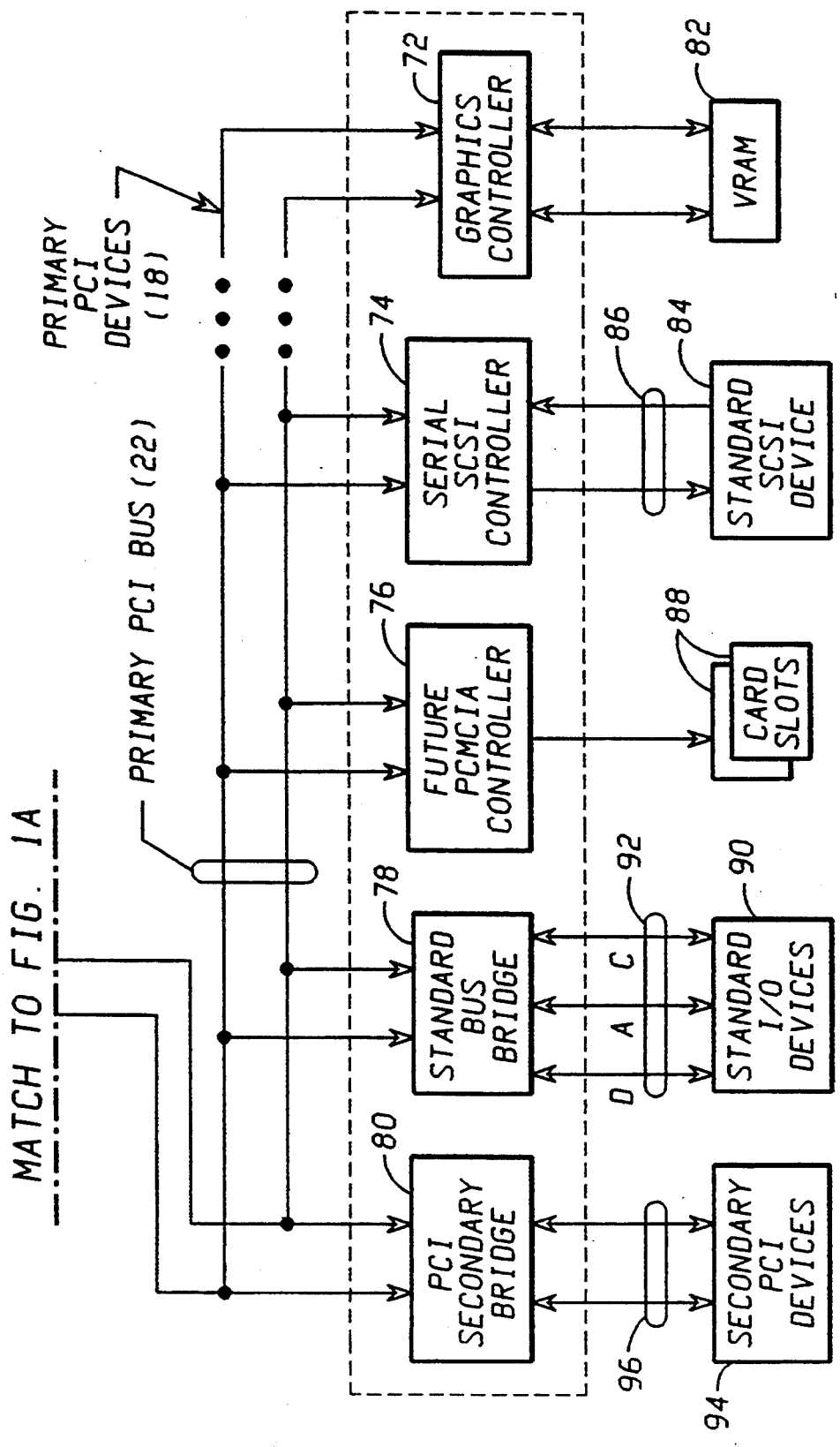

Referring now to FIG. 1, a dual bus information handling system 10 is shown generally at 10, comprising, (i) a processor, cache and memory complex 12 connected to S-bus (system bus) devices 14 via an S-bus 16 and (ii) primary Peripheral Component Interconnect (PCI) devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIG. 1 will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc. under the trade designation i486™, although it is contemplated that the system 10 may be implemented using other types of CPUs, especially x86-type microprocessors. The self-test circuit 26 provides a built-in-self-test (BIST) feature for the CPU 24 upon power-up. The self-test circuit also controls any self-test features which may be provided within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by a S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM) which is used to temporarily store address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle, the memory controller does not pass information onto the S-bus. However, if the memory controller determines that the operation it is managing is an I/O cycle, the memory controller propagates the information onto the S-bus for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIG. 1, are a direct memory access (DMA) controller 40, a system arbitration control point: (SACP) 42, an input/output (I/O) controller 44, a PCMCIA controller 46, and a power management controller 48. An optional power management controller 50 may be attached to the power management controller 49 in case more sophisticated power management control is desired. A buffer 52 is provided on the S-bus 16 intermediate the DMA controller 40 and the I/O controller 44. As shown in FIG. 1, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller 44 are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. The PCI bus 22 is comprised of a new bus architecture called PCI. The primary PCI bus 22 is a high performance bus, meaning that it performs significant data transfer in a relatively short period of time, up to 120 megabytes of data per second. The PCI bus achieves this high level of performance, in part, because it may be directly linked to other high speed buses such as the S-bus 14, and thus may provide for a fast transfer of data between the CPU 24 or other S-bus devices 14 and the primary PCI devices 18. In fact, the operation of several high integration devices, such as certain graphics packages, require a direct link to a system bus such as the S-bus through a high performance bus like the PCI bus 22.

In addition, the PCI bus architecture does not require any "glue logic" to operate peripheral devices connected to it. Glue logic for other buses typically consists of miscellaneous hardware components such as a decoders, buffers or latches that are installed intermediate the peripheral devices and the bus.

The primary PCI bus 22 operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data.

The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while standard non-multiplexed buses typically require twice this number. Accordingly, because the number of signals are reduced, the number of pins required to support a device linked to the PCI bus is also reduced a corresponding amount. PCI architecture is thus particularly adapted for highly integrated desktop computer systems.

A more detailed description of the structure and operation of PCI bus architecture is provided in "Peripheral Component Interconnect (PCI) Revision 1.0 Specification", published Jun. 22, 1992; "Preliminary PCI System Design Guide", revision 0.6, published Nov. 1, 1992, and "Peripheral Component Interconnect (PCI) Add-in Board/Connector Addendum", (Draft) published 6 Nov., 1992; all by the PCI Special Interest Group, the contents of which references are incorporated herein by reference as if they were fully set forth.

Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may reside on these buses.

The PCI host bridge 20 is a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIG. 1, these devices may include a graphics controller 72, a serial SCSI (small computer systems interface) controller 74, a future PCMCIA controller 76, a standard bus (e.g., ISA or MICRO CHANNEL® ("MC-A")) bridge 78, and a PCI secondary bridge 80. The devices shown in FIG. 1 attached to the primary PCI bus, however, are only one example of a system implementing a PCI bus architecture and thus the disclosed configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22. The architecture of an MC-A version of the standard bus bridge 78 is the subject of the following copending patent applications assigned to the IBM Corporation:

Secondary PCI devices 94 are connected to PCI bridge 80 via secondary PCI bus 96. Any number of unidentified secondary PCI devices 94 may be connected to the secondary PCI bus 96. The PCI bridge 80 serves as an interface between any number of PCI devices 94 attached to the secondary PCI bus 96 and the primary PCI bus 22.

Any number of peripheral devices compatible with the PCI bus architecture may be arranged on the primary PCI bus 22 with no other PCI buses present in the entire computer system 10; or any number of PCI peripheral devices could be attached to the primary PCI bus 22 with any number of secondary PCI buses, in addition to PCI bus 96, attached through the same number of separate, respective PCI bridges 80 to the primary PCI bus 22. Each secondary PCI bus could also have any number of additional PCI buses attached through PCI bridges to it and these "tertiary" PCI buses could have further PCI buses attached to them in various combinations. Similarly each PCI bus could have any number of PCI devices attached to it. Each connection between two PCI buses must be through a PCI bridge identical to bridge 80.

Furthermore, it is possible that a plurality of bridges identical to PCI host bridge 20 could be driven by the S-bus 16. Each of these host bridges could then have any number of PCI buses, bridges and devices connected to them in any arrangement that the designer of system 10 wishes. Thus, the portion of system 10 that is comprised of PCI bus architecture may be comprised of multiple buses and PCI peripheral devices arranged in various peer and hierarchical combinations (referred to hereinafter generally as a PCI network).

Figure 2:
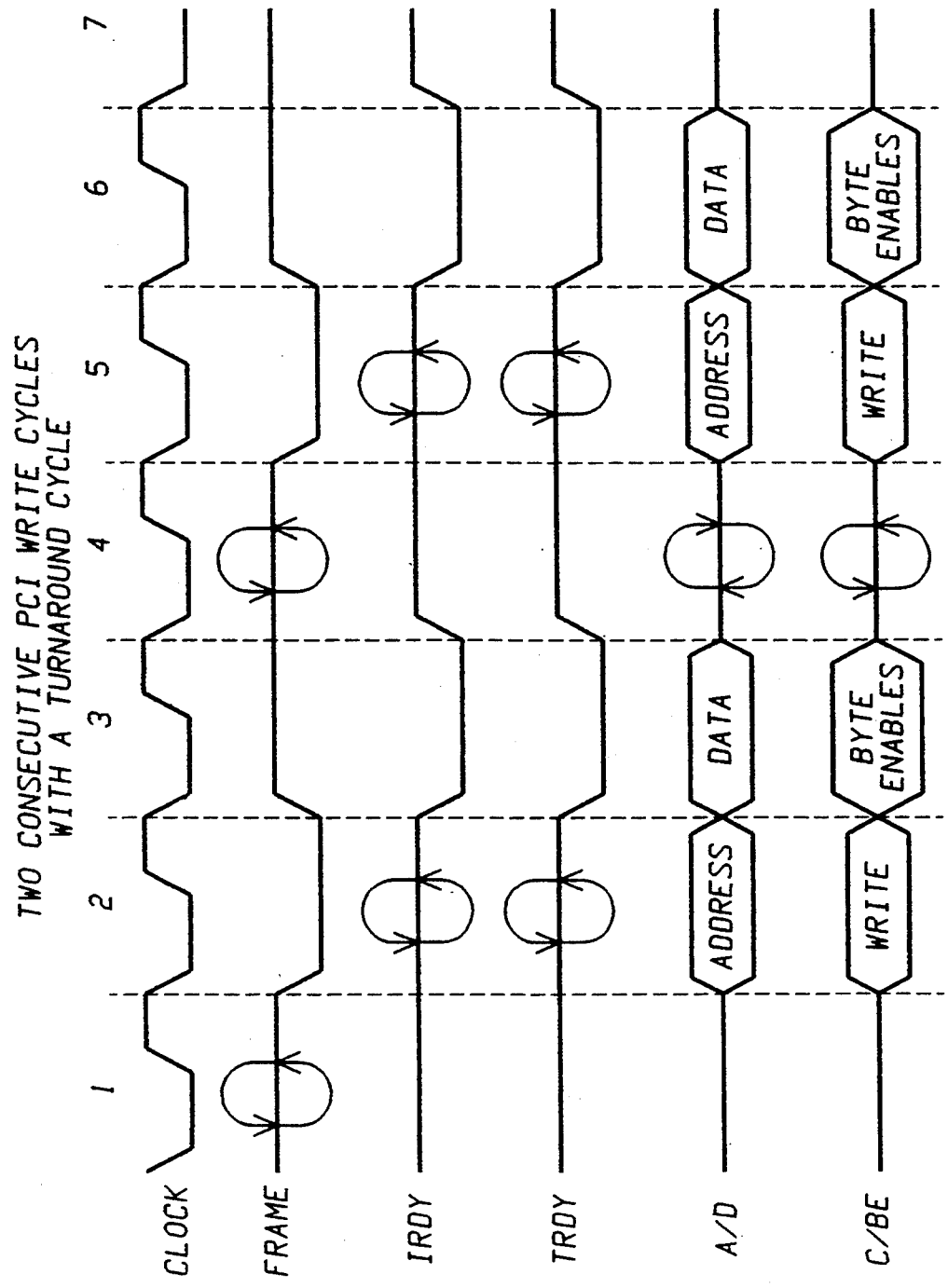
FIG. 2 is a timing diagram of consecutive write cycles with a turnaround cycle between them.

Referring now to FIG. 2, a timing diagram of various PCI bus signals during two consecutive write cycles to a peripheral device attached to primary PCI bus 22 is shown. This peripheral device could be graphics controller 72, standard bus bridge 78 or any other peripheral device that can be driven from a PCI bus. Similarly, the write cycles shown in FIG. 2 are typical PCI bus write cycles and are not unique to primary PCI bus 22. They could be write cycles on secondary PCI bus 96 or any other PCI bus in the PCI network.

The clock signal (CLOCK) provides the timing for all communications on the PCI network. CLOCK is an input to every PCI device and all PCI bridges. CLOCK is synchronous, meaning that all communication signals in PCI architecture have a duration of at least one clock signal and any commands or data transfers are executed over the period of at least one clock signal. The signals in FIG. 2 are separated into individual "clocks" by the vertical dashed lines. Each dashed line represents the beginning of one clock duration and the end of the immediately preceding clock duration. The signals on each line are sampled or have their effective meaning for a particular clock on the rising edge of that clock.

The frame signal (FRAME) is used by any PCI bridge or peripheral device connected to the PCI bus to indicate that it is initiating a communication cycle, or an access, to another PCI bridge or peripheral device connected to the bus. The peripheral device or PCI bridge initiating all access is called a master. The device, component or PCI bridge to which the access is directed is called a slave. In PCI bus architecture, many signals become enabled or are activated when they are driven to a low. FRAME is one of those signals. Thus, when a master drives the FRAME low as shown in clock No. 2, a master is indicating to a slave that the master is initiating an access.

The initiator ready signal (IRDY) is also activated when it is low and indicates when the master is ready for a data transfer to begin. Thus, the master drives IRDY low when it is ready to accept data during a read cycle or transfer data to the slave during a write cycle.

The target ready signal (TRDY) is activated low and indicates when a slave is ready for a data transfer to begin. Thus, the slave drives TRDY low when it is ready to accept data from the master during a write cycle or to transfer data to the master during a read cycle.

The address/data signal (AD) carries both the address of a register to which a data transfer is targeted and the data that is to be transferred multiplexed on one line. The address information is driven on AD by the master during an address phase when it asserts FRAME. Depending upon whether the access is a write cycle or a read cycle, the master or slave, respectively, will provide the data that is then driven on AD after the address phase. The address phase has the duration of one clock, and the data phase is at least one clock but can be more than one clock if the data transfer is a burst transfer.

A burst transfer is a data transfer in which one address is provided during the address phase and several data phases occur thereafter. During the first data phase, the data is transferred into or out of the address provided in the address phases. During the succeeding data phases, the data transfers take place at the respective addresses that sequentially succeed the address provided in the address phase. The invention described herein is not applicable to burst transfers, but only single data transfers in which address phases and data phases have a one to one correspondence.

The command/byte enable signal (C/BE) provides PCI bus commands and a byte enable signal multiplexed on one line. A bus command is asserted by the master when it asserts FRAME and the address information on AD. The bus command can either be a read or a write command depending upon which type of access the master is initiating.

The byte enable signal is present on C/BE during the data transfer on AD. The byte enable signal is 4 bits in length, the four bits being identified as bit numbers 0–3. When all of these four bits are activated low, they indicate that all four bytes (all 32 bits) of data being transferred on AD are enabled and should be written or read during the data transfer. When one of the four bits is a high (the binary value of 1), then one of the corresponding four bytes of data being transferred on the PCI bus is disabled and should be ignored in the data transfer.

In FIG. 2, the turnaround cycles for the various signals are shown by the circular arrows. For example, during the first clock, a turnaround cycle is being executed on the FRAME signal meaning no masters are driving it.

During the second clock, a master drives FRAME low which means the master is initiating an access to a slave. IRDY and TRDY are in a turnaround cycle during the second clock.

At this time, the master provides the address of the register in the slave to which the access is targeted on the AD line. Simultaneously, a write command is generated by the master on the C/BE line.

Moving on to the third clock, FRAME is deasserted, which means the access is ready to be completed. The master now has gained control of the IRDY line and drives it low, indicating the master is ready to transfer data to the slave. The slave has also gained control of the TRDY line and activates it low, indicating that it has decoded the address information as an address of a register within itself and is ready to accept data in that register. Thus, on the third clock, data is transferred on the AD line from the master into the slave in its decoded register. The C/BE line asserts a signal at this time indicating whether the data is valid.

In the fourth clock, since the data transfer is complete, IRDY and TRDY are deasserted. Also, FRAME goes through a turnaround cycle because it may be driven by another master during the next data transfer. During the fourth clock, the AD and C/BE line also go into a turnaround cycle because they could also be driven by another master during the next data transfer.

During the fifth clock the timing diagram repeats itself since another write cycle has been initiated. This second write cycle could be initiated by the same master or a different one. Similarly, the target of the write cycle could be the same slave or an entirely different one. To eliminate any risk of contention on the TRDY by two different slaves, TRDY goes through a turnaround cycle in clock No. 5.

Accordingly, the least amount of time in which a write operation can be completed, before another data transfer can begin is three clock signals. This is because one clock signal must be included for the turnaround cycles on the various PCI signal lines. If these turnaround cycles could be eliminated, then the least amount of time in which a write cycle could be completed, before beginning another data transfer would be two clock signals. Accordingly, the number of clock signals required to complete a write cycle would reduce from 3 to 2, effectively increasing the speed of a write cycle by 33%. This speed increase is illustrated in FIG. 3.

Figure 3:
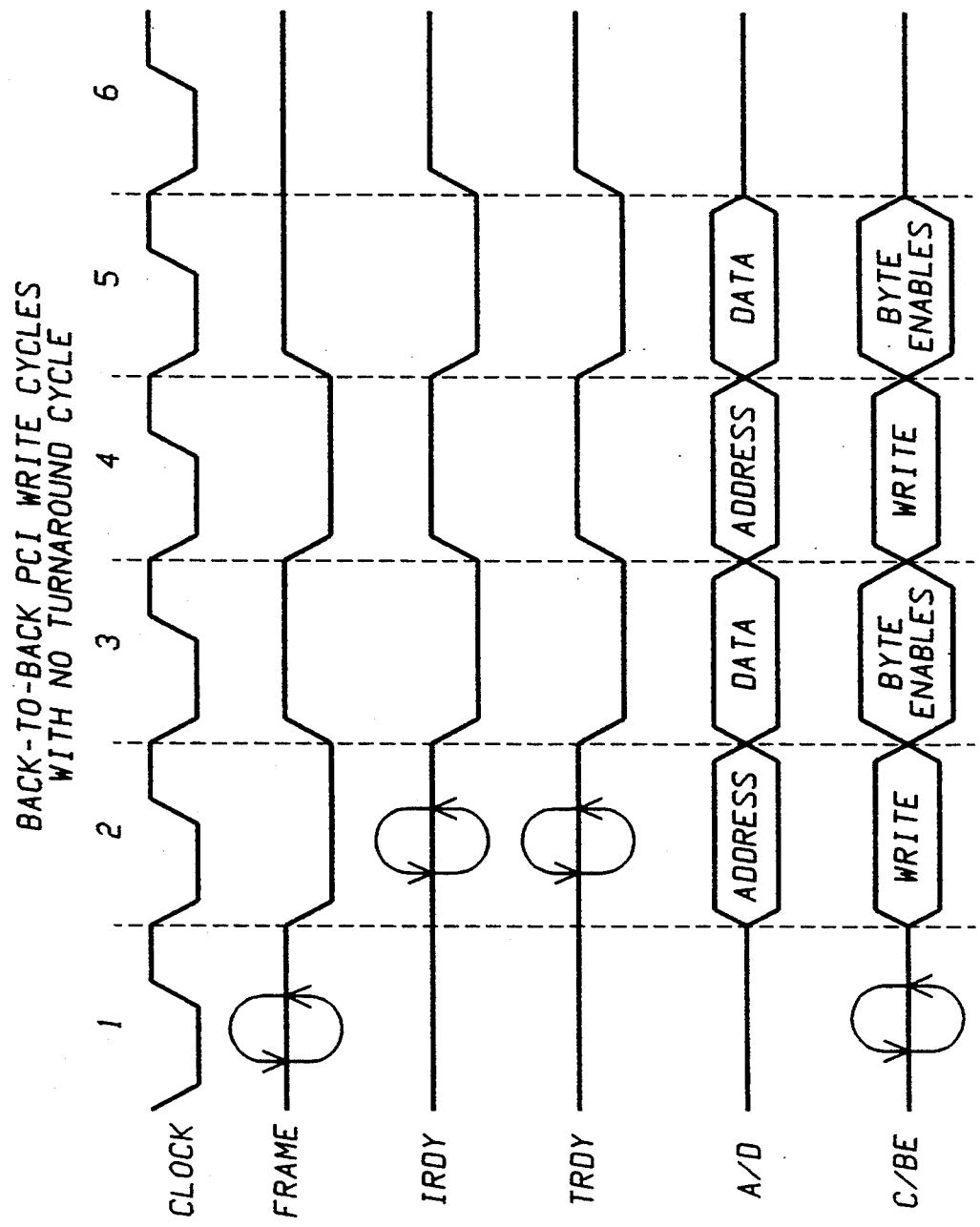
FIG. 3 is a timing diagram of consecutive write cycles that are back-to-back.

Referring now to FIG. 3, a timing diagram of various PCI bus signals during two write cycles without an intervening turnaround cycle, or "back-to-back" write cycles, is shown. The master asserts the FRAME in the second clock, initiating the first write cycle. The address information and write command are also asserted on the AD and C/BE lines, respectively, during the second clock. During the third clock, data is transferred to the particular register of the slave corresponding to the address information on the AD line because IRDY and TRDY are asserted.

In the fourth clock, another write operation begins when the master asserts the FRAME signal low. Accordingly, the write operation is repeated in clock. Nos. 4 and 5 with the AD lines supplying a different address to be written into and presumably different data to be written.

As FIG. 3 illustrates, when the turnaround cycle between the two write cycles is eliminated, the first write cycle is completed in 2 clock signals and the second write cycle can begin immediately thereafter. Thus, the speed advantage discussed above is realized.

Back-to-back cycles can only be used when the same master is writing data to the same slave in both cycles. If both the master and slave are the same for both cycles, then the risk of contention to use the communication lines of the PCI bus is eliminated. Thus, the need for turnaround cycles is eliminated.

Moreover, if the same master is writing data to the same slave in several consecutive write cycles, the need for turnaround cycles between each pair of write cycles is also eliminated. If these needless turnaround cycles could be eliminated, this whole string of write cycles could be arranged back-to-back further increasing the speed of data transfers.

Thus, if a master could determine whether it is directing consecutive write cycles to the same slave, it could eliminate needless turnaround cycles to increase the speed of the PCI bus. Accordingly, the invention described herein provides a method and apparatus for detecting when consecutive write cycles are directed to the same slave and eliminating unnecessary turnaround cycles.

Read cycles, however, always require turnaround cycles between them and require at least 3 clock signals to complete. This is because both the master and slave must use the AD line during a read cycle.

Figure 4:
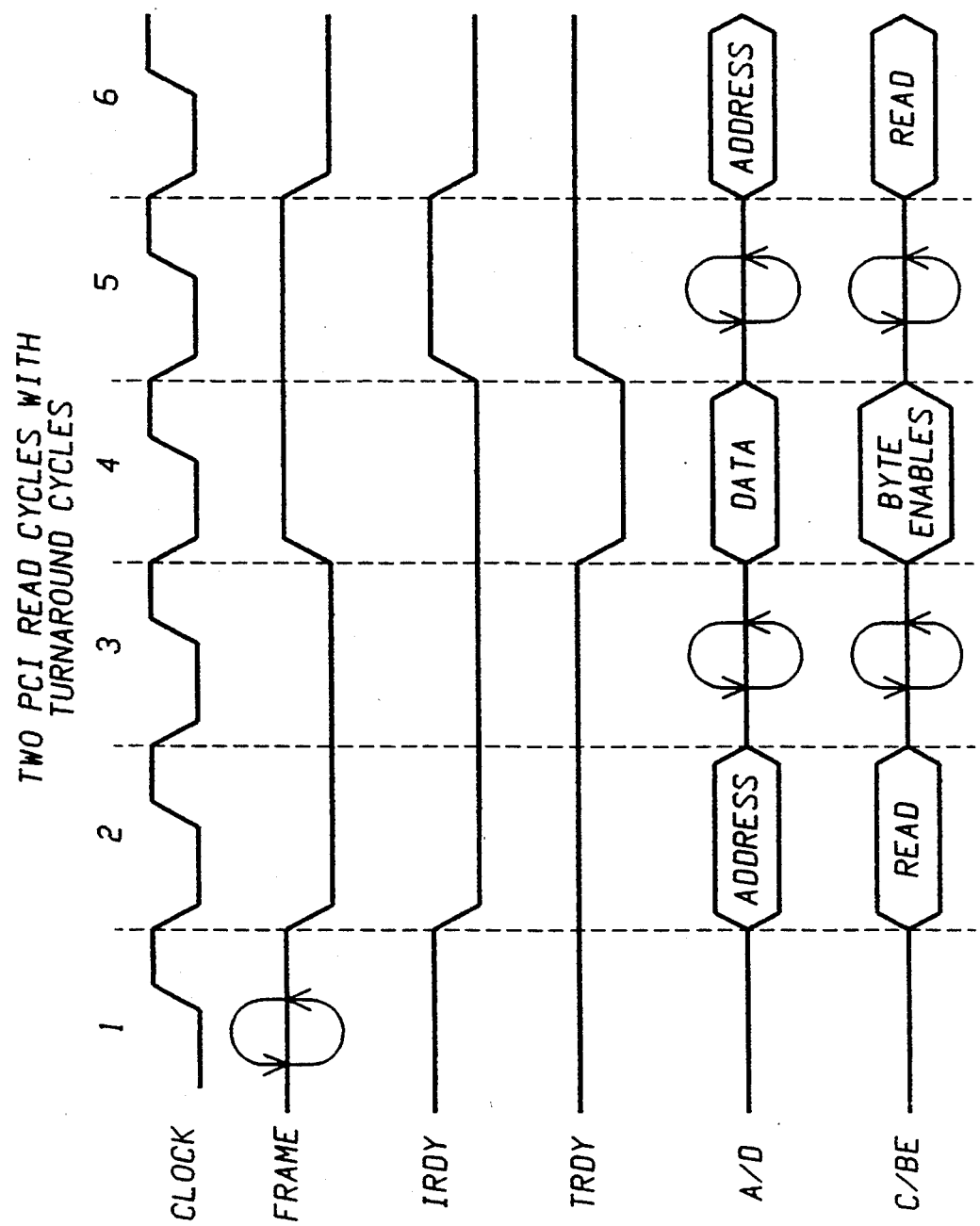
FIG. 4 is a timing diagram of two read cycles with turnaround cycles.

Referring specifically now to FIG. 4, a timing diagram of a read cycle and the start of another read cycle is shown. During clock No. 2, the master asserts both the FRAME and IRDY low. Address information is also supplied on AD by the master and a read command is given on the C/BE line.

In the third clock sequence, the AD line must go into a turnaround cycle because the slave has to take control of the AD line during the fourth clock signal to provide the data that the master has requested to read. This turnaround cycle is necessary to eliminate contention between the master and slave on the AD line. The FRAME and IRDY signals remain low during clock No. 3 because the data is not yet ready to be transferred from the slave to the master.

During the fourth clock signal, the slave provides the data on the AD line and asserts TRDY. The byte enables are also asserted on the C/BE line. Since the IRDY signal is still low in the fourth clock, the data to be read is transferred from the slave to the master. FRAME is deasserted during clock No. 4 because the data transfer is completed.

If the master is going to conduct a second read cycle after the first, the AD line must go through another turnaround cycle as shown in clock 5. This eliminates contention between the master and the slave as control of the AD line is shifted back to the master from the slave. The master then can begin the second read cycle during clock No. 6 when it asserts FRAME to a low and asserts an address value on the AD line.

The turnaround cycles that are present between the address and data phases in read cycles and that are between two consecutive read cycles are necessary to eliminate contention for the AD line between the master and the slave. Thus, the present invention has no application to read cycles or consecutive read cycles.

Figure 5:
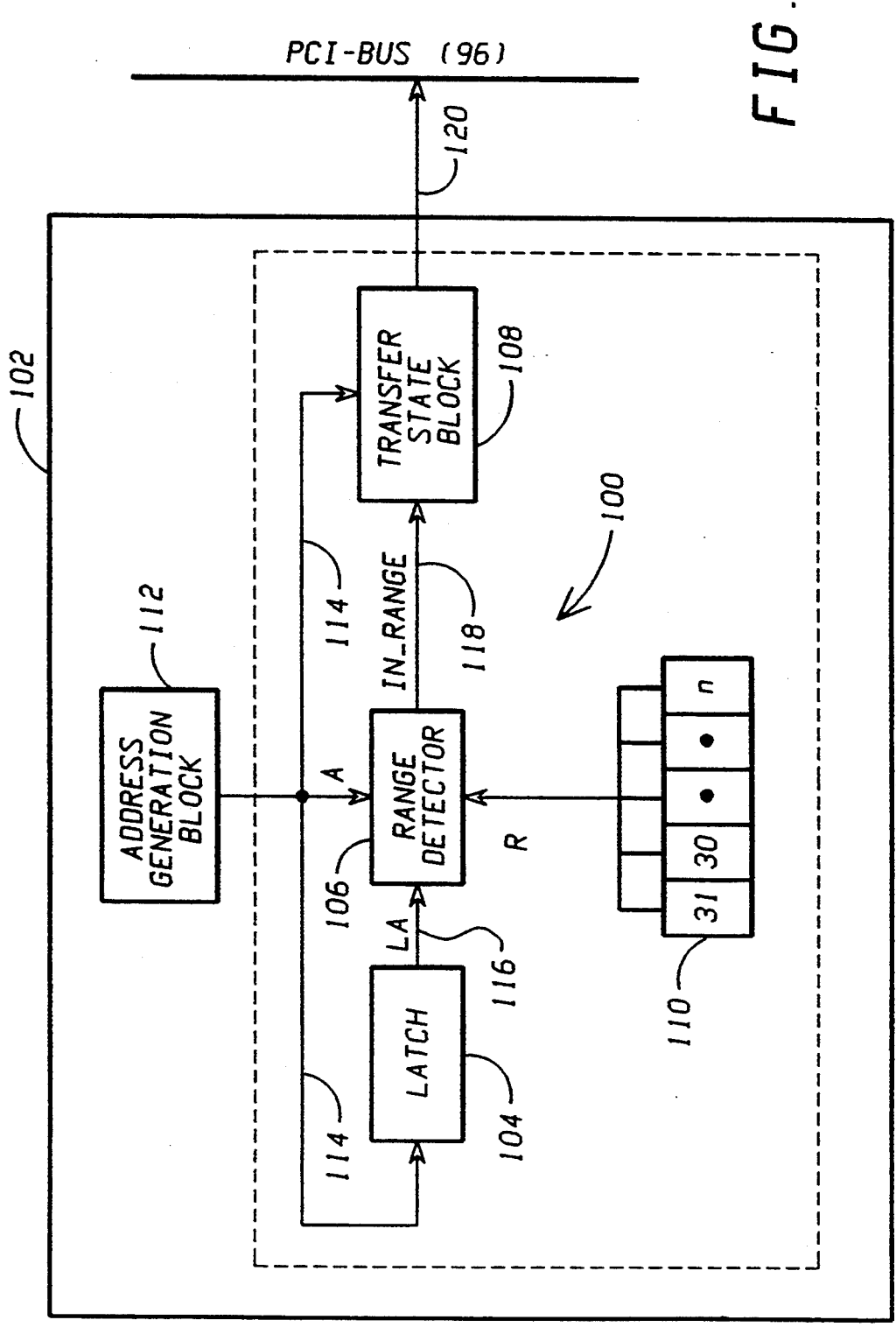
FIG. 5 is a block diagram of the hardware within a master device required to generate back-to-back data transfers.

Referring now to FIG. 5, a block diagram of range detection hardware 100 in a PCI master 102 is shown. Range detection hardware 100 is optional and only is required in a PCI master device if designer of the system or PCI master wishes the particular PCI master device to perform back-to-back write cycles. Each PCI master which is to perform back-to-back write cycles, however, must have range detection hardware 100 within it.

Range detection hardware 100 is comprised of a latch register 104, a range detector 106, a transfer state block 108 and a range register 110. An address generation block 112 of the PCI master 102 is also shown; however, the address generation block 112 is not part of the range detection hardware 100.

The address generation block 112 of PCI master 102 is connected through an output line 114 to latch register 104, range detector 106 and transfer state block 108. The latch register is connected by an output line 116 to range detector 106.

Range detector 106 is connected to transfer state block 108 through output line 118. The output signal from range detector 106 on output line 118 is labeled IN_RANGE.

Transfer state block has an output line 120 connected to secondary PCI bus 96. Output line 120 is connected to the AD line of PCI bus 96. PCI bus 96 is used by way of example, but any PCI bus could be substituted for it in the preferred embodiment.

Address generation block 112 is the logic within the master 102 that generates the address information for a particular write cycle. This address information indicates the location of a register within a slave device attached to PCI bus 96. The logic that comprises address generation block 112 is unique to each PCI master and is beyond the scope of this invention. Furthermore, whether this logic is known depends upon whether a particular PCI master is known.

The address signal generated by address generation block 112 is 32 bits in length. Each binary combination of the low and high values of these bits indicates a different register address. With 32 bits, there are four gigabytes of different combinations of bit values. Thus, there are four gigabytes of possible addresses which can be assigned to the registers within the peripheral devices and PCI bridges connected to a single PCI bus.

The bits of each address signal are numbered from 0 to 31. The address values are divided into 4-bit blocks each providing the value for a hexadecimal number. Thus, each address value is a combination of 8 hexadecimal numbers.

The lowest ordered hexadecimal number of an address is contained in bit numbers 0 through 3; and the highest ordered hexadecimal number is contained in bit numbers 28 through 31. Thus, each binary combination of bit numbers 0 through 3 indicates one address, and each binary combination of bit numbers 28 through 31 indicates at least several million addresses. Accordingly, if the difference in the binary combinations of two address values occurs in bit numbers 0 through 3, then the two addresses are within a range of 16 addresses of each other. In contrast, if the difference occurs in bit numbers 28 through 31, then the range of address values between the two addresses is more than a million.

The latch register 104 is a known 32-bit register within the range detection hardware 100. Once a 32-bit value is input to latch register 104, the 32-bit value remains or "latches" within latch register 104 until another 32-bit value is input to it, at which time the latch register 104 outputs the latched value. The 32-bit values input to latch register 104 are the addresses generated by address generation block 112.

Range register 110 is a register within the configuration space of the PCI master 102. Configuration space is space reserved in a PCI master for configuration of the PCI master. A complete description of configuration in PCI architecture is provided in the co-pending application assigned to I.B.M. Corporation entitled, "METHOD AND APPARATUS FOR INITIALIZING MULTIPLE BUS NETWORKS IN AN INFORMATION HANDLING SYSTEM," which is incorporated herein by reference. The purpose of range register 110, as more fully set forth below, is to provide a range to be input to range detector 106, which ensures that consecutive write cycles are directed to the same slave.

Range register 110 can be any number of bits in length depending upon the design constraints of the information handling system. The design constraint that dictates the bit length of range register 110 is the slave connected to PCI bus 96 that has the smallest amount of memory, and thus, the smallest number of addresses within it. The number of addresses in this slave provides the largest range that ensures two consecutive write cycles are targeted to the same slave. For example, if the slave with the smallest amount of memory connected to PCI bus 96 has an amount of memory that guarantees that a memory address within 64K of any of its memory addresses is also within its memory, then 64K is the largest range that ensures two consecutive write cycles are targeted to the same slave. As set forth below, the size of this range dictates the number of bits required in range register 110.

The bits in range register 110 correspond to the highest numbered bits of latch register 104, and thus, the highest numbered bits of the addresses generated by address generation block 112. For example, if range register 110 is 16 bits in length, then its first bit corresponds to the highest bit number of latch register 104, bit number 31. This is because the bit numbers of latch register 104 range from 0 to 31. Referring to the example above, the sixteenth and last bit of range register 110 corresponds to bit number 16 of latch register 104.

The bit number of latch register 104 that the last bit of range register 110 corresponds to has the value n, since the number of bits in range register 110, as set forth above, is a variable. Thus, in the above example, n=16.

As stated above, the largest range in which two addresses are ensured to be within the same slave dictates the number of bits in range register 110. This is because differences between the binary combinations of two addresses that occur in bits with numbers lower than a certain numbered bit are ensured to be within a certain range. Thus, changes between the binary combinations of two addresses within these lower numbered bits do not have to be checked to determine if a certain address is within the preset range. For example, if the range is 64K, then changes in the binary combinations of bit numbers 0 through 15 will surely be within the range. Accordingly, range register 110 would only require 16 bits corresponding to bit numbers 16 through 31 of the addresses generated by address generation block 112. These then are the only bits that need to be input to range detector 106. All bits of range register 110 are permanently set to the binary value of 0.

Figure 6:
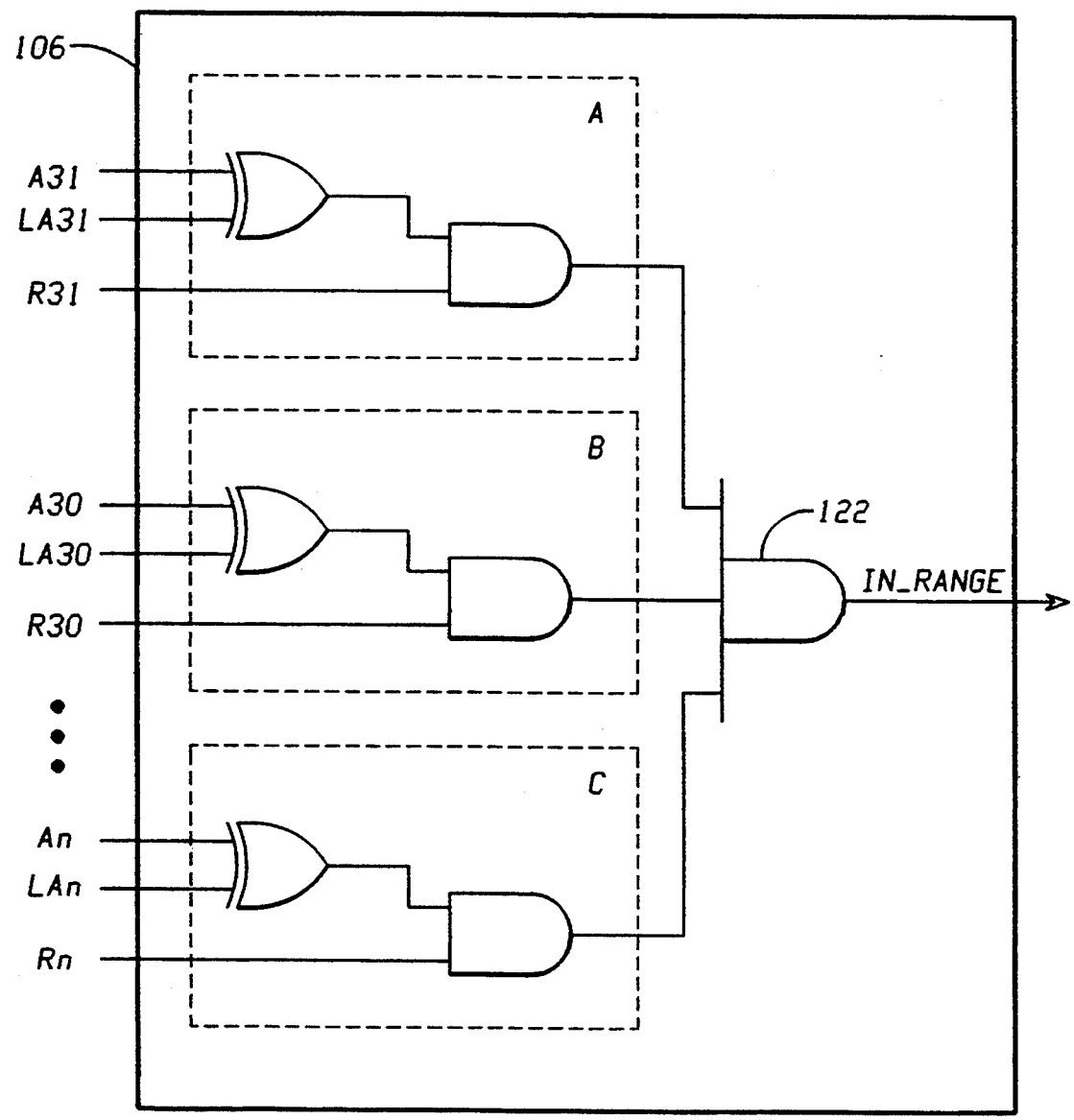
FIG. 6 is a logic diagram of a range detector within the hardware shown in FIG. 5.

Referring now to FIG. 6, a logic diagram of range detector 106 is shown. Range detector 106 is comprised of a plurality of logic networks each having an output connected to a multiple input AND gate 122. Each logic network is comprised of an exclusive OR gate (XOR) and an AND gate. Three such logic networks are shown in FIG. 6, labeled A, B, and C, respectively; however, the number of logic networks in a range detector 106 is equal to the number of bits in its range register 110. Thus, if the range register 110 has 16 bits then range detector 106 will have 16 logic networks.

Each logic network corresponds to a bit number of the 32-bit address signal generated by address generation block 112. The first logic network in range detector 106 corresponds to the highest bit number of the address signal, bit number 31. The last logic network in range detector 106 corresponds to bit number n of the address signal. The logic networks between the first and last logic network of range detector 106 correspond to the bit numbers of the address signals between 31 and n in descending order. Thus, the second logic network in range detector 106 corresponds to bit number 30 of the address signal. Logic network C in FIG. 6 corresponds to the bit number of the address signal having the value n.

The XOR gate of each logic network has two inputs; one from a single bit of latch register 104 and one from a single bit of the address signal generated by address generation block 112. The bit number of both of these bits is the bit number of the address signal that corresponds to the particular logic network in which the XOR gate is located. Thus, bit number 31 of the latch register 104 and bit number 31 of the address signal from address generation block 112 are input to the XOR gate of the first logic network in range detector 106. The bits input to the XOR gates from the address generation block 112 and latch register 104 are designated as $A_x$ and $LA_x$, respectively, with x being equal to the bit number of the bit.

The inputs to the AND gate of each logic network of range detector 106 are the output from the corresponding XOR gate of the particular logic network and the inverted value of a bit from range register 110. The bit from range register 110 corresponds to the bit number x of that particular logic network. The output of each AND gate of each logic network is inverted and then input to AND gate 122.

AND gate 122 generates the output, IN_RANGE, which when high indicates that an address targeted for a write cycle is within the range selected by range register 110, and thus, is targeted to the same slave as the previous write cycle. When IN_RANGE is low, then the present write cycle is targeted for a slave other than the slave to which the previous write cycle was targeted.

IN_RANGE is input to transfer state block 108. Transfer state block has known internal logic which drives the AD line of PCI bus to one of three states. When IN_RANGE is high, transfer state block 108 merely passes the address value it receives from address generation block 112 on to the AD line of PCI bus 96. When IN_RANGE is low, transfer state block 108 causes the AD line of PCI bus 96 to go into a turnaround state for a turnaround cycle. When no address is asserted by address generator 112, transfer state block 108 drives the AD line to a constant mid-level state between a low and a high signal meaning that the master is still driving the AD line, but is not presently transferring data on it.

In operation, on the first clock signal, the address generation block 112 of the PCI master generates the address to which the first write cycle is targeted on line 114. This 32-bit value is latched into latch register 104, and is transmitted on both lines 116 and 114 to range detector 106. Accordingly, the LA and A binary values are identical for all bit numbers. Thus, the output of all XOR gates in range detector 106 are low, which, in turn, causes the inverted outputs of all AND gates in range detector 106 to be high. As a result, IN_RANGE is high, which causes transfer state block 108 to transfer the address for the first write cycle onto the AD line of PCI bus 96 to the targeted slave. The master also asserts FRAME and the write command during the first clock signal.

During the second clock signal, data is transferred from the master to the slave. Of course, this is only true if both TRDY and IRDY have been asserted.

During the third clock signal, address generation block 112 generates a second address to which a write cycle is targeted on line 114. The second address signal triggers latch 104 to output the first 32-bit address on line 116 to range detector 106.

If any A bit has a binary value which is different from the binary value of its corresponding LA bit, then the XOR gate that corresponds to these bits will have a binary high output. This causes the inverted output of the corresponding AND gate to be low which causes the IN_RANGE output of AND gate 122 to be low.

When IN_RANGE is low, transfer state block causes a turnaround cycle to be generated on the AD line of PCI bus 96. This is because the second address is outside of the range set in range register 110, which means that the second write cycle could be targeted for a slave different from the slave that contained the first address.

If there are no differences between the binary values of LA and A in the third clock, then range detector 106 operates identically as it did for the first write cycle, and IN_RANGE becomes high. Accordingly, transfer state block passes the second address on to the AD line of PCI bus 96 and the master asserts FRAME and a write command. Thus, back-to-back write cycles will have been executed, eliminating the unnecessary turnaround cycle between them. If several more write cycles are to be executed in succession, they will be executed back-to-back until one of the A bits is different from its corresponding LA bit.

In an alternative embodiment, range register could be 32 bits, or any other number of bits in length, and could be adjustable. Thus, the range could be changed if required.

The adjustments would be accomplished by simply inserting a binary 1 value into the lower ordered bits that can change from address to address without exceeding the desired range. Inserting a binary 1 in a bit in range register 110 results in the output of the logic network in range detector 106 that corresponds to the bit always being high. Thus, the changes between the LA and A inputs to the logic network have no effect on the output of AND gate 122.

Although the preferred embodiment is described with a PCI bus, the application of the invention is not in any way limited to PCI bus architecture. Indeed, the invention is applicable to any bus architecture fin which signals are multiplexed together requiring turnaround cycles to eliminate contention.

Accordingly the preferred embodiment of a method and apparatus for providing back-to-back data transfers in an information handling system having a multiplexed bus has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information handling system, comprising:
   a central processing unit attached to a system bus;
   a peripheral bus connected to :said system bus, said peripheral bus including a plurality of signal lines, each of said plurality of signal lines having a status which is either active or inactive and which status is changeable upon a transition of a system clock, said system clock transitions defining successive clock cycles on said peripheral bus;
   a plurality of slave devices and a master device connected to said peripheral bus, each of said slave devices including register space identified by target addresses to which data may be written by said master device during a write cycle over said peripheral bus;
   one of said signal lines of said peripheral bus being a target ready line which is activated by a slave device to indicate a readiness of said slave device to accept data from said master device during a write cycle, said target ready line being shared by all of said plurality of slave devices;
   another of said signal lines being a multiplexed address/data line which is activated by a master device, said address/data line when active carrying target address and data corresponding to a particular write cycle, said master device able to execute back-to-back write cycles in which address/data information for a second write cycle immediately follows address/data information for a first write cycle without any inactive clock cycles on said address/data line therebetween; and detection logic including a detector for (i) determining if a first target address corresponding to a first write cycle and a second target address corresponding to a second write cycle both reside within a predetermined range of target addresses, and (ii) issuing a signal to which said master device responds by executing back-to-back write cycles if both said first and second target addresses reside within said predetermined range.

2. The information handling system of claim 1 wherein said detection logic further comprises a first register for storing said first target address until said master device generates said second target address, and a second register for storing said predetermined range of target addresses, said second register having a field for storing a certain number of bits.

3. The information handling system of claim 2 wherein said detector has a plurality of logic networks equal to the number of bits stored in said second register field.

4. The information handling system of claim 3 wherein each of said plurality of logic networks includes an exclusive OR gate for comparing a bit of said first address stored in said first register to a bit of said second address generated by said master device and for generating said signal if the binary values of said bits are different.

5. The information handling system of claim 4 wherein each of said plurality of logic networks further includes an AND gate having as a first input a bit stored in said second register field and as a second input the output of said exclusive OR gate of said logic network, and an output.

6. The information handling system of claim 5 wherein all of said outputs of each of said AND gates are input to a multiple input AND gate in said detector, said multiple input AND gate having an output.

7. The information handling system of claim 6 wherein said output of said multiple input AND gate is high if said first and second target addresses reside within said predetermined range of target addresses.

8. The information handling system of claim 5 wherein said first input and said output are inverted.

9. The information handling system of claim 2 wherein said predetermined range is adjustable by adjusting the length of said second register field.

10. The information handling system of claim 1, wherein said peripheral bus conforms to PCI architecture.

11. The information handling system of claim 10, wherein said back-to-back write cycles involves sending 32-bit data strings over said multiplexed address/data line in a single clock cycle.

12. The information handling system of claim 1, wherein said predetermined range of target addresses is confined to said register space in one of said slave devices.

13. The information handling system of claim 1, wherein said detection logic is incorporated into said master device.

14. A method of handling data transfers in a system comprising a central processing unit attached to a system bus, and a peripheral bus connected to the system bus, wherein a plurality of slave devices and a master device are connected to the peripheral bus, said method comprising the steps of:

providing a plurality of signal lines in part comprising said peripheral bus, each of said plurality of signal lines having a status which is either active or inactive and which status is changeable upon a transition of a system clock, said system clock transitions defining successive clock cycles;

establishing register space in each of said slave devices which is identified by target addresses to which data may be written by said master device during a write cycle over said peripheral bus;

defining one of said signal lines of said peripheral bus to be a target ready line which is activated by a slave device to indicate a readiness of said slave device to accept data from said master device during a write cycle, said target ready line being shared by all of said plurality of slave devices;

defining another of said signal lines to be a multiplexed address/data line which is activated by a master device, said address/data line when active carrying target address and data corresponding to a particular write cycle, said master device able to execute back-to-back write cycles in which address/data information for a second write cycle immediately follows address/data information for a first write cycle without any inactive clock cycles on said address/data line therebetween;

determining if a first target address corresponding to a first write cycle and a second target address corresponding to a second write cycle both reside within a predetermined range of target addresses; and issuing a signal to which said master device responds by executing back-to-back write cycles if both said first and second target addresses reside within said predetermined range.

15. The method of claim 14 wherein said peripheral bus conforms to PCI architecture.

16. The method of claim 15, wherein said back-to-back write cycles involve sending 32-bit data strings over said multiplexed address/data line in a single clock cycle.

17. A detection mechanism for handling data transfers in a system comprising (a) a central processing unit attached to a system bus, (b) a peripheral bus connected to the system bus, the peripheral bus including a plurality of signal lines, each of the plurality of signal lines having a status which is either active or inactive and which status is changeable upon transitions of a system clock which define successive clock cycles on the peripheral bus, and (c) a plurality of slave devices and a master device connected to the peripheral bus, each of the slave devices including register space identified by target addresses to which data may be written by the master device during a write cycle over the peripheral bus, each of the slave devices sharing a target ready line on the peripheral bus which is activated by a slave device to indicate a readiness to accept data from the master device during a write cycle; the detection logic comprising:

(i) a first register for storing a first target address corresponding to a first write cycle until the master device generates a second target address corresponding to a second write cycle;

(ii) a second register having a field for storing a certain number of bits corresponding to a predetermined range of target addresses; and (iii) a detector for determining if said first target address and said second target address both reside within said predetermined range of target addresses, and for issuing a signal if both said first and second target addresses reside within said predetermined range, the master device responsive to said signal to execute back-to-back write cycles in which address/data information for a second write cycle immediately follows address/data information for a first write cycle, on a multiplexed address/data line of the peripheral bus, without any inactive clock cycles on said address/data line therebetween.

18. The detection mechanism of claim 17, wherein said detector includes a plurality of logic networks corresponding to the number of bits stored in said second register field.

19. The detection mechanism of claim 18, wherein each of said plurality of logic networks includes an exclusive OR gate for comparing a bit of said first address stored in said first register to a bit of said second address generated by said master device and for generating a high signal if the binary values of said bits are different.

20. The detection mechanism of claim 19, wherein each of said plurality of logic networks further includes an AND gate having as a first input a bit stored in said second register field and as a second input the output of said exclusive OR gate of said logic network.

21. The detection mechanism of claim 17 wherein said peripheral bus conforms to PCI architecture.

22. The detection mechanism of claim 21, wherein said back-to-back write cycles involve sending 32-bit data strings over said multiplexed address/data line in a single clock cycle.

23. The detection mechanism of claim 17, wherein said detection logic is incorporated into the master device.

* * * * *